K. NYSTRÖM.
HOLDER FOR THE BALLS IN BALL BEARINGS.
APPLICATION FILED AUG. 26, 1918.
1,327,169.
Patented Jan. 6, 1920.
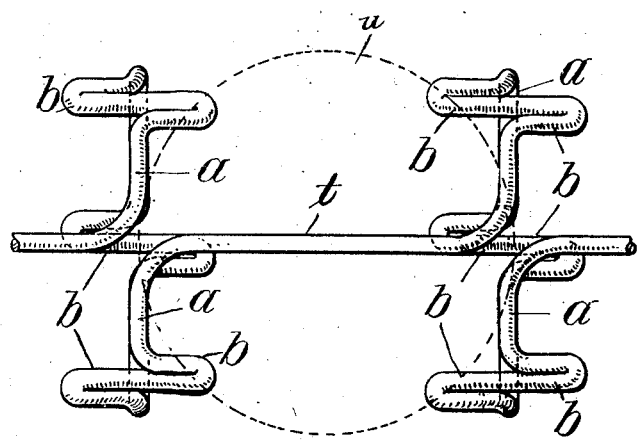
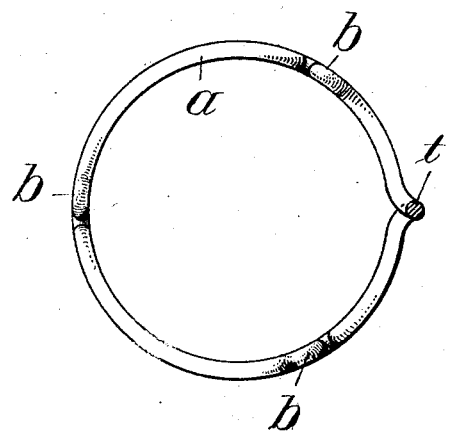
Inventor:
Knut Nyström
per H. W. Plucker
Attorney.

UNITED STATES PATENT OFFICE.

KNUT NYSTRÖM, OF STOCKHOLM, SWEDEN.

HOLDER FOR THE BALLS IN BALL-BEARINGS.

1,327,169.  Specification of Letters Patent.  Patented Jan. 6, 1920.

Application filed August 26, 1918. Serial No. 251,544.

*To all whom it may concern:*

Be it known that I, KNUT NYSTRÖM, merchant, a subject of the Kingdom of Sweden, residing at 9 Biblioteksgatan, Stockholm, Sweden, have invented certain new and useful Improvements in Holders for the Balls in Ball-Bearings, of which the following is a specification.

This invention relates to wire cages for ball bearings, and has for its object to provide a structure of this kind wherein the friction between the balls and the cage is greatly reduced, and wherein any danger of the balls falling out of the cage is eliminated.

In the drawings, which illustrate by way of example, an embodiment of my invention:

Figure 1 shows a portion of the wire cage including two of the radial circles or loops between which the balls may be inserted;

Fig. 2 is a cross-sectional view taken at right angles to the wire $t$ in Fig. 1.

The cage comprises a continuous length of wire $t$ which is bent, at regular intervals, to form a series of small circles or loops $a$ which are radial to the axis of the bearing and adapted to receive the balls $u$ between them. These circles or loops $a$ are provided with lateral members or projections which may be secured thereto by welding or otherwise, but are preferably formed by forming one or more sharp bends or kinks in the wire, as clearly shown at $b$, $b$ in Fig. 1. These projections $b$ are adapted to engage the balls, which are thus held at a few points only of their surface, but are kept out of contact with the other portions of the loops $a$ and, of course, with each other. In the example shown in the drawing, I have shown three projections on both sides of each loop $a$, but this number obviously may be varied.

The arrangement described increases the elasticity of the wire cage and provides efficient means for securely holding the balls therein, while considerably reducing the friction owing to the small number of contact points between the balls and the cage.

I claim:

1. A cage for a ball bearing comprising a wire bent to form a series of equidistant circular loops radial to the axis of the bearing and having lateral projections adapted to engage the balls introduced between adjacent loops.

2. A cage for a ball bearing comprising a wire bent to form a series of equidistant circular loops radial to the axis of the bearing, and kinks in said loops arranged transversely thereof.

In testimony whereof I have affixed my signature in presence of two witnesses.

KNUT NYSTRÖM.

Witnesses:
 JOHN EDBERG,
 H. TELANDER.